(12) United States Patent
Takayanagi

(10) Patent No.: US 10,029,210 B2
(45) Date of Patent: Jul. 24, 2018

(54) EXHAUST GAS PURIFICATION APPARATUS AND METHOD FOR INTERNAL COMBUSTION ENGINE

(71) Applicant: Mitsubishi Heavy Industries Engine & Turbocharger, Ltd., Kanagawa (JP)

(72) Inventor: Ko Takayanagi, Tokyo (JP)

(73) Assignee: Mitsubishi Heavy Industries Engine & Turbocharger, Ltd., Kanagawa (JP)

( * ) Notice: Subject to any disclaimer, the term of this patent is extended or adjusted under 35 U.S.C. 154(b) by 0 days.

(21) Appl. No.: 14/421,797

(22) PCT Filed: Oct. 25, 2013

(86) PCT No.: PCT/JP2013/078901
§ 371 (c)(1),
(2) Date: Feb. 13, 2015

(87) PCT Pub. No.: WO2014/069342
PCT Pub. Date: May 8, 2014

(65) Prior Publication Data
US 2015/0231569 A1    Aug. 20, 2015

(30) Foreign Application Priority Data
Oct. 30, 2012    (JP) ................................ 2012-238691

(51) Int. Cl.
*B01D 53/94* (2006.01)

(52) U.S. Cl.
CPC ..... *B01D 53/9495* (2013.01); *B01D 53/9409* (2013.01); *B01D 53/9431* (2013.01)

(58) Field of Classification Search
CPC .... B01D 53/34; B01D 53/74; B01D 53/8643; B01D 53/885; B01D 53/92; B01D 53/9431; B01D 53/9436
See application file for complete search history.

(56) References Cited

U.S. PATENT DOCUMENTS

| | | | |
|---|---|---|---|
| 6,314,722 B1 * | 11/2001 | Matros | F01N 3/0231 422/169 |
| 2004/0074229 A1 | 4/2004 | Upadhyay et al. | |
| 2010/0050614 A1 | 3/2010 | Parmentier et al. | |
| 2011/0000194 A1 | 1/2011 | Gonze et al. | |
| 2011/0192147 A1 * | 8/2011 | Hoskin | F01N 3/208 60/286 |
| 2011/0262329 A1 * | 10/2011 | Ofoli | B01D 53/90 423/213.2 |
| 2011/0296905 A1 | 12/2011 | Bastoreala et al. | |
| 2013/0108529 A1 * | 5/2013 | Toshioka | B01D 53/90 423/212 |

FOREIGN PATENT DOCUMENTS

| | | |
|---|---|---|
| CN | 101637702 A | 2/2010 |
| CN | 101832167 A | 9/2010 |
| CN | 101943044 A | 1/2011 |
| EP | 2256312 A1 | 12/2010 |
| JP | 2001027113 A | 1/2001 |
| JP | 2003286828 A | 10/2003 |
| JP | 2009281350 A | 12/2009 |
| JP | 2009293444 A | 12/2009 |
| JP | 2010248963 A | 11/2010 |
| JP | 2010261423 A | 11/2010 |
| WO | 2010103380 A1 | 9/2010 |
| WO | 2014069342 A1 | 5/2014 |

OTHER PUBLICATIONS

Extended European Search Report, App. No. 13850570,6, dated May 3, 2016, 9 Pages.
PCT, Notification Concerning Transmittal of International Preliminary Report on Patentability, App. No. PCT/JP2013/078901, Filed Oct. 25, 2013, dated May 14, 2015, 7 Pages.
PCT, Notification of Transmittal of Translation of the International Preliminary Report on Patentability, App. PCT/JP2013/078901, Filed Oct. 25, 2013, dated May 14, 2015, 10 Pages.
Japanese ISR, App. No. PCT/JP2013/078901, Filed Oct. 25, 2013, 10 Pages.
Mitsubishi Heavy Industries, Ltd., Notification Concerning Submission, Obtention or Transmittal of Priority Document, Application No. PCT/JP2013/078901, Filed Oct. 25, 2013, dated Dec. 11, 2013, 1 Page.
Mitsubishi Heavy Industries, Ltd., International Search Report, Application No. PCT/JP2013/078901, Filed Oct. 25, 2013, dated Jan. 28, 2014, 4 Pages.
Decision to Grant a Patent, App. No. JP2012-238691, Drafting Date Dec. 26, 2016, dated Jan. 6, 2017, 6 Pages.
First Office Action, Chinese App. No. 201380043174.X, Issuing No. 2016070100123170, dated Jul. 6, 2016, 23 Pages.
Examination Report, IN App No. 1131/DELBP/2015, dated Feb. 21, 2018, 6 Pages.

* cited by examiner

*Primary Examiner* — Paul S Hyun
(74) *Attorney, Agent, or Firm* — Berkeley Law & Technology Group, LLP

(57) ABSTRACT

In embodiments, an exhaust gas purification apparatus and method for an internal combustion engine initializes a SCR catalyst by heating the SCR catalyst under predetermined conditions without accompanying troublesome procedures and complicated calculations. With the exhaust gas purification apparatus for an internal combustion engine, arranged on an exhaust-gas passage of the internal combustion engine and including the SCR catalyst for purifying NOx in exhaust gas in the internal combustion engine, the method calculates and accumulates estimated values of $NH_3$ adsorption adsorbed on the SCR catalyst, on the basis of the amount of $NH_3$ injection from urea-aqueous solution injected into the exhaust-gas passage from the upstream side of the SCR catalyst and the amount of $NH_3$ injection for purifying NOx at the upstream side of the SCR catalyst, and initializing the SCR catalyst by heating the SCR catalyst to initialize the estimated value of $NH_3$ adsorption.

11 Claims, 6 Drawing Sheets

EXHAUST GAS PURIFICATION APPARATUS AND METHOD FOR INTERNAL COMBUSTION ENGINE

TECHNICAL FIELD

The present invention relates to an exhaust gas purification apparatus and an exhaust gas purification method for an internal combustion engine. It especially relates to an exhaust gas purification apparatus and an exhaust gas purification method for an internal combustion engine employing selective catalytic reduction (SCR), a technique for selectively purifying nitrogen oxide (NOx) in exhaust gas using ammonia as a reducing agent.

BACKGROUND

To meet the exhaust emission regulations (NOx and particulate matters (PM) emission regulations) for diesel engines, recent techniques reduce NOx and PM by performing various controls, such as hardware control, operational control, and temperature control of the engine, and also purify exhaust gas using an after-treatment device. As an after-treatment device, a diesel particulate filter (DPF) for collecting PM and an SCR catalyst for purifying NOx are often used.

Using an SCR catalyst, NOx is purified as follows, for instance.

1) Urea is injected at an upstream side of the SCR catalyst in response to the amount of NOx at the upstream side of the SCR, the temperature of the SCR catalyst, the flow rate of the exhaust gas, or the like. The amount of NOx here is measured by a sensor, or estimated.
2) The injected urea is degraded to ammonia ($NH_3$) to be adsorbed on the SCR catalyst.
3) NOx in the exhaust gas is purified by the adsorbed $NH_3$ when passing through the SCR catalyst.

Meanwhile, when the amount of $NH_3$ exceeds an amount that can be adsorbed on the SCR catalyst, $NH_3$ is discharged into the exhaust gas, which is a phenomenon referred to as $NH_3$ slip. When the amount of $NH_3$ adsorption is small, the NOx purification rate decreases. Thus, monitoring the amount of $NH_3$ adsorption is important in determining the purification rate of NOx. However, it is difficult to measure an actual amount of $NH_3$ adsorption, and thus the amount of $NH_3$ adsorption is generally estimated on the basis of e.g. a measurement by an NOx sensor mounted to an exhaust duct. Still, when estimating the amount of $NH_3$ adsorption, an error inevitably occurs due to various causes. For instance, there may be measurement errors or calculation errors of various parameters due to decreases in the accuracy of various sensors, for instance. If subsequent processes are to be continued, errors would be accumulated, which prevents highly accurate control of the amount of urea injection and suitable purification of NOx. As a result, it becomes necessary to initialize the amount of $NH_3$ adsorption.

Patent Document 1 discloses an exhaust purification apparatus of an internal combustion engine which initializes the amount of $NH_3$ adsorption. That is, in the technique for initializing the amount of $NH_3$ adsorption disclosed in Patent Document 1, the amount of reducing-agent adsorption on a NOx catalyst is calculated on the basis of a time-series to balance between supply of the reducing agent to the NOx catalyst upon adding the reducing agent by a reducing-agent adding technique and consumption of the reducing agent in a reducing reaction in the NOx catalyst. Further, the amount of NOx introduced to the NOx catalyst or correlated parameters are calculated. Finally, on the basis of the calculated result, initialization is executed at a determined timing.

Patent Document 1 refers to Japanese Unexamined Patent Application No. 2009-281350

SUMMARY

As described above, the initialization procedure in Patent Document 1 is troublesome and includes complicated calculations. The present invention was proposed to overcome the above inconvenience. An object of the present invention is to provide an exhaust gas purification apparatus and an exhaust gas purification method for an internal combustion engine capable of initializing an SCR catalyst by heating the SCR catalyst under predetermined conditions without troublesome procedures or complicated calculations.

An exhaust gas purification apparatus for an internal combustion engine includes: an SCR catalyst for purifying NOx in exhaust gas of the internal combustion engine, disposed on an exhaust-gas passage of the internal combustion engine; and an exhaust gas purification controller part. The exhaust gas purification controller part includes: a $NH_3$ adsorption calculation part to calculate an estimate of an amount of $NH_3$ adsorption which is adsorbed on the SCR catalyst, on the basis of an amount of injection of $NH_3$ produced from urea-aqueous solution injected into the exhaust-gas passage from an upstream side of the SCR catalyst and an amount of $NH_3$ for purifying NOx at the upstream side of the SCR catalyst; a NOx estimate derivation part to derive an estimate of an amount of NOx at a downstream side of the SCR catalyst on the basis of the estimate of the amount of $NH_3$ adsorption from the $NH_3$ adsorption calculation part and a temperature of the SCR catalyst; and a SCR catalyst heating command part to heat the SCR catalyst in order to initialize the amount of $NH_3$ adsorption of the SCR catalyst on the basis of an error between the estimate of the amount of NOx from the NOx estimate derivation part and a measurement of the amount of NOx at the downstream side of the SCR catalyst.

To initialize the SCR catalyst, the present invention focuses on the decrease in the amount of $NH_3$ adsorption upon an increase of the temperature of the SCR catalyst. That is, the decreasing amount of $NH_3$ adsorption upon an increase in the temperature of the SCR catalyst means that $NH_3$ would be discharged almost directly, which is defined as initialization of the SCR catalyst. Since it is difficult to obtain an actual measurement of the amount of $NH_3$ adsorption, it is estimated from the amount of urea ($NH_3$) injection and the amount of $NH_3$ injection for purifying the amount of NOx at the upstream side of the SCR catalyst, as in the following equation.

$$\text{Estimate of the amount of } NH_3 \text{ adsorption } (g) = \int(\text{the amount of urea injection} - \text{the amount of } NH_3 \text{ injection for purification})$$

Then, from a map showing a relationship between the estimate of the amount of $NH_3$ adsorption and the temperature of the SCR catalyst, for instance, the purification rate of NOx is derived, and this purification rate of NOx and the amount of NOx at the upstream side of the SCR catalyst are calculated to estimate the amount of NOx at the downstream side of the SCR catalyst. Next, this estimate of the amount of NOx at the downstream side of the SCR catalyst is compared to the actual measurement of the amount of NOx at the downstream side of the SCR catalyst. If the error occurring is increasing, it is determined that continuing the subsequent processes would lead to accumulation of the errors, which makes it impossible to execute highly accurate control of the amount of urea injection and suitable purification of NOx. As a result, the SCR catalyst is heated to be initialized.

The estimate of the amount of NOx at the downstream side of the SCR catalyst is derived from the estimate of the $NH_3$ adsorption from the $NH_3$ adsorption calculation part and the temperature of the SCR catalyst. The temperature of the SCR catalyst is then increased on the basis of an error between the estimate of the amount of NOx at the downstream side of the SCR catalyst and the measurement of the amount of NOx at the downstream side of the SCR catalyst. As a result, the amount of $NH_3$ adsorption decreases. As a consequence, the $NH_3$ injected from the upstream side of the SCR catalyst is not adsorbed on the SCR catalyst so that the SCR catalyst does not execute NOx purification at all, which means that initialization of the SCR catalyst is achieved.

Further, the exhaust gas purification controller part includes a SCR catalyst initialization determination part to determine initialization of the SCR catalyst on the basis of an error between the estimate of the amount of NOx and the measurement of the amount of NOx at the downstream side of the SCR catalyst.

Further, the SCR catalyst initialization determination part is to determine initialization of the SCR catalyst on the basis of whether a predetermined time has elapsed after completion of heating of the SCR catalyst.

It is possible to issue the SCR catalyst heating commands for heating the SCR catalyst to initialize the SCR catalyst.

Further, the exhaust gas purification controller part includes a SCR catalyst heating capability determination part to determine that heating of the SCR catalyst is possible, when it is determined that the SCR catalyst is within an operational range in which heating is possible and that forced regeneration of a filter for removing particulate matters in the exhaust gas is unnecessary.

As a result, it is possible to determine that heating of the SCR catalyst is possible when it is determined that the SCR catalyst is within an operational range in which heating is possible and the SCR catalyst is not heated for forced regeneration of the filter for removing particulate matters. Thus, the SCR catalyst would not be heated unnecessarily.

Further, an exhaust gas purification method is for an internal combustion engine that purifies NOx in exhaust gas in the internal combustion engine using a SCR catalyst arranged on an exhaust-gas passage of the internal combustion engine. The exhaust gas purification method includes: calculating an estimate of an amount of $NH_3$ adsorption which is adsorbed on the SCR catalyst, on the basis of an amount of injection of $NH_3$ produced from urea-aqueous solution injected into the exhaust-gas passage from an upstream side of the SCR catalyst and an amount of $NH_3$ for purifying NOx at the upstream side of the SCR catalyst; deriving an estimate of an amount of NOx at a downstream side of the SCR catalyst on the basis of the estimate of the amount of $NH_3$ adsorption and a temperature of the SCR catalyst, and determining initialization of the SCR catalyst on the basis of an error between the estimate of the amount of NOx and a measurement of the amount of NOx at the downstream side of the SCR catalyst; and heating the SCR catalyst to initialize the amount of $NH_3$ adsorption of the SCR catalyst.

In this way, it is possible to calculate the estimate of the amount of $NH_3$ adsorption and then derive the estimate of the amount of NOx at the downstream side of the SCR catalyst from the estimate of $NH_3$ adsorption and the temperature of the SCR catalyst. Further, it is possible to obtain an error between the estimate of the amount of NOx at the downstream side of the SCR catalyst and the measurement of the amount of NOx at the downstream side of the SCR catalyst, and then determine whether to initialize the SCR catalyst from this error. When it is determined to initialize the SCR catalyst, the SCR catalyst is heated so that the amount of $NH_3$ adsorption decreases. As a result, $NH_3$ injected from the upstream side of the SCR catalyst is not adsorbed on the SCR catalyst and the SCR catalyst is in a state where NOx purification cannot be performed at all, which means that initialization of the SCR catalyst is achieved.

Further, before the SCR catalyst heating, a SCR catalyst heating capability determination is executed. This determines that heating of the SCR catalyst is possible when it is determined that the SCR catalyst is within an operational range in which heating is possible and that forced regeneration of a filter for removing particulate matters in the exhaust gas is unnecessary.

In this way, it is possible to determine that heating of the SCR catalyst is possible when it is determined that the SCR catalyst is within an operational range in which heating is possible and that the SCR catalyst is not heated for the forced regeneration of a filter for removing particulate matters in the exhaust gas. As a result, the SCR catalyst is not heated unnecessarily.

In the SCR catalyst initialization determination, the SCR catalyst is determined to be initialized when a cumulative value of NOx errors is smaller than a lower limit of an error, or when the cumulative value of NOx errors is greater than an upper limit of an error.

In this way, it is possible to determine initialization of the SCR catalyst when the cumulative value of NOx error is smaller than the lower limit of an error, or when the cumulative value of NOx errors is greater than the upper limit of an error.

Further, in the SCR catalyst initialization determination, the SCR catalyst is determined to be initialized when a predetermined time has elapsed after determining completion of the heating of the SCR catalyst.

In this way, when a predetermined time has elapsed after determining completion of the heating of the SCR catalyst, it may be considered that NOx errors have been accumulated, and a determination regarding the initialization of the SCR catalyst is necessary.

Further, in the SCR catalyst heating, an inlet temperature of a filter for removing particulate matters that collects particulate matters in the exhaust gas at the upstream side of the SCR catalyst is controlled upon forced regeneration of the filter for removing particulate matters.

In this way, it is possible to simplify control of the inlet temperature of the filter for removing PM.

Further, the inlet temperature of the filter for removing particulate matters is controlled on the basis of a target inlet temperature that is different from one used upon forced regeneration of the filter for removing particulate matters.

In this way, it is possible to restrict the inlet temperature of the filter for removing PM to be low, and thus to reduce oil dilution.

Further, the inlet temperature is increased to the target inlet temperature at a predetermined increase rate from a start of temperature increase.

In this way, it is possible to restrict $NH_3$ slip.

Further, the inlet temperature is increased to the target inlet temperature in a plurality of stages from the start of the temperature increase.

In this way, it is possible to reduce $NH_3$ slip and oil dilution.

Further, the target inlet temperature is corrected by the temperature of the SCR catalyst or a temperature at the upstream side of the SCR catalyst.

Further, the inlet temperature of the filter for removing particulate matters is controlled on the basis of an outlet temperature of the filter for removing particulate matters.

Further, the inlet temperature of the filter for removing particulate matters is controlled on the basis of the temperature at the upstream side of the SCR catalyst.

Further, the inlet temperature of the filter for removing particulate matters is controlled on the basis of the temperature of the SCR catalyst.

It is possible to heat the SCR catalyst securely even in a cold place.

It is possible to achieve initialization of the SCR catalyst by calculating an estimate of the amount of $NH_3$ adsorption, deriving an estimate of the amount of NOx at the downstream side of the SCR catalyst, determining initialization of the SCR catalyst on the basis of the error between the estimate of the amount of NOx at the downstream side of the SCR catalyst and the measurement of the amount of NOx at the downstream side of the SCR catalyst, and heating the SCR catalyst. Thus, it is no longer necessary to execute troublesome steps and complicated calculations, unlike the conventional techniques.

DETAILED DESCRIPTION

An exhaust gas purification apparatus and an exhaust gas purification method for an internal combustion engine will be described below in detail for various embodiments and referring to the accompanying drawings.

Figure 1:
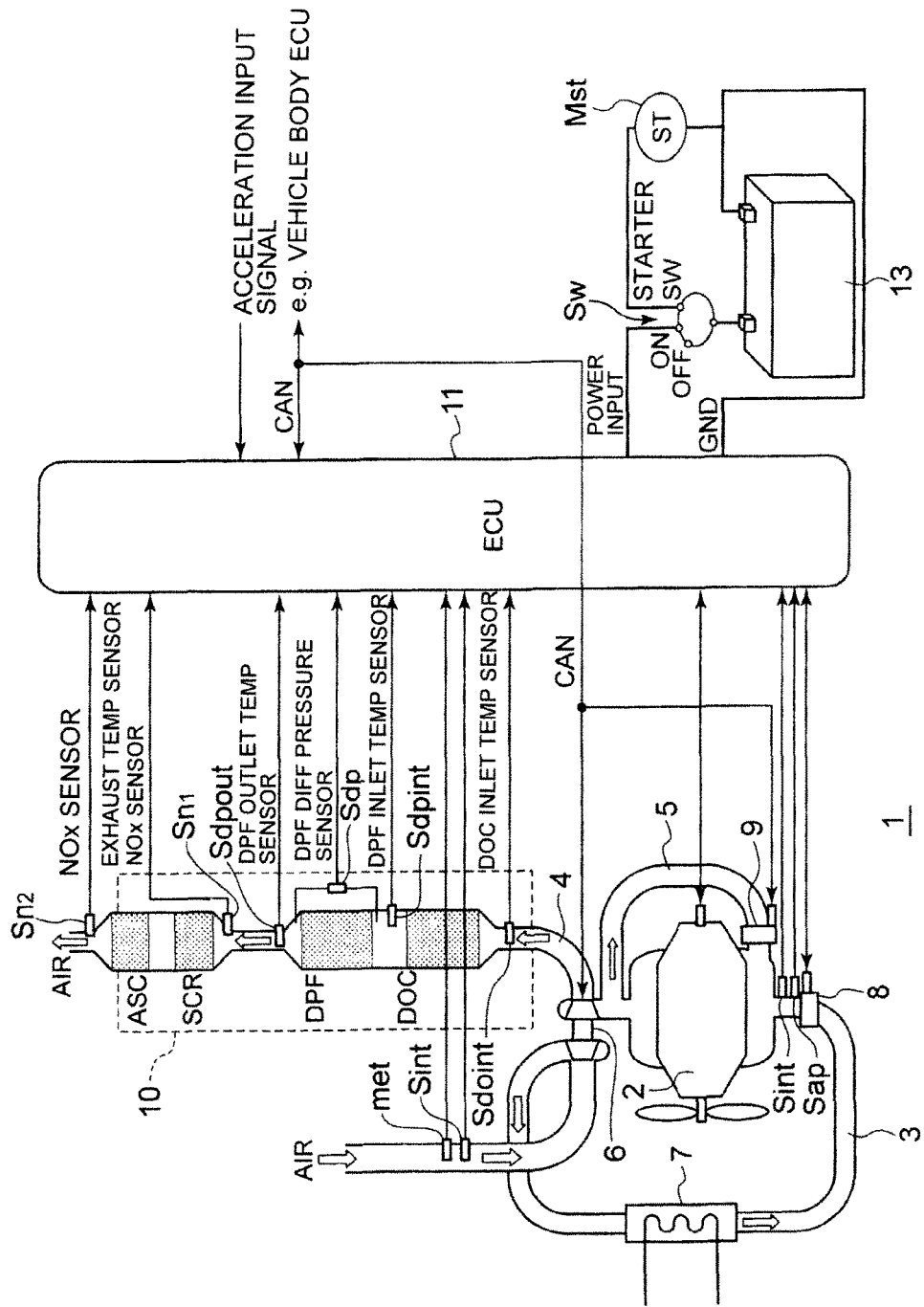
FIG. 1 is a schematic system diagram according to a first embodiment of an internal combustion engine for implementing an exhaust gas purification method for an internal combustion engine according to the present invention.

FIG. 1 illustrates an example of an intake-and-exhaust system and an electrical system of an internal combustion engine 1 including an exhaust gas purification apparatus of a first embodiment. The internal combustion engine 1 includes an intake-and-exhaust system in which an intake duct 3, an exhaust duct 4, and an exhaust gas recirculation (EGR) duct 5 are connected to an engine body 2. A compressor and a turbine of a turbocharger 6 are disposed on the flow path of the exhaust duct 4 so as to be interposed between the upstream side of the intake duct 3 and the vicinity of the outlet of the engine. An intercooler 7 is disposed on the intake duct 3. Further, the intake duct 3 includes an intake throttle valve 8, while the EGR duct 5 includes an EGR valve 9. Moreover, an exhaust gas purification apparatus serving as an after-treatment device for exhaust gas is connected to the exhaust duct 4 so as to communicate with the exhaust duct 4.

An electronic control unit (ECU, i.e., engine control unit) is provided for the intake-and-exhaust system of the above engine body 2, as a part of the electrical system. The ECU 11 receives sensor outputs from various sensors (described below) disposed on the engine body 2, the intake duct 3, the exhaust duct 4, the EGR duct 5, and the exhaust gas purification apparatus 10. The ECU 11 also receives acceleration input signals and other signals, which will be described below. In addition to executing the predetermined signal processing and calculation processing, the ECU 11 executes the essentials of the present invention, such as determining the SCR catalyst initialization, determining whether it is possible to heat the SCR catalyst, and heating of the SCR catalyst, which will be described below. An in-vehicle battery 13 is electrically connected to the ECU 11 via a key switch Sw. A starter motor $M_{st}$ is electrically connected to the in-vehicle battery 13 via the key switch Sw.

An injector, a common-rail pressure sensor, a combustion temperature sensor, a crank sensor, a cam sensor, a water temperature sensor, a hydraulic pressure switch, or the like, none of which is illustrated, are connected to the engine body 2 to communicate signals with the ECU 11. An airflow meter $m_{et}$ and an intake temperature sensor $S_{int}$ are disposed at the upstream side of the intake duct 3. The intake throttle valve 8, an intake absolute pressure sensor $S_{ap}$, and an intake temperature sensor $S_{int}$ are disposed on the downstream side of the intake duct 3, which is the inlet side of the engine body 2. The EGR valve 9 is disposed on the EGR duct 5. A diesel oxidation catalyst (DOC) inlet temperature sensor $S_{doint}$, a DPF inlet temperature sensor $S_{dpint}$, a DPF differential pressure sensor $S_{dp}$, a DPF outlet temperature sensor $S_{dpout}$, a NOx sensor $S_{n1}$, an exhaust temperature sensor (not illustrated), a NOx sensor $S_{n2}$ are each disposed on the exhaust gas purification apparatus 10 at the downstream side of the exhaust duct 4, arranged in this order from the upstream side. The details will be described later. The signals of the NOx sensor $S_{n1}$, the exhaust temperature sensor, and the NOx sensor $S_{n2}$ are transmitted to the ECU 11. Further, the turbocharger 6 and the intake throttle valve 8 are driven by the ECU 11.

Figure 2:
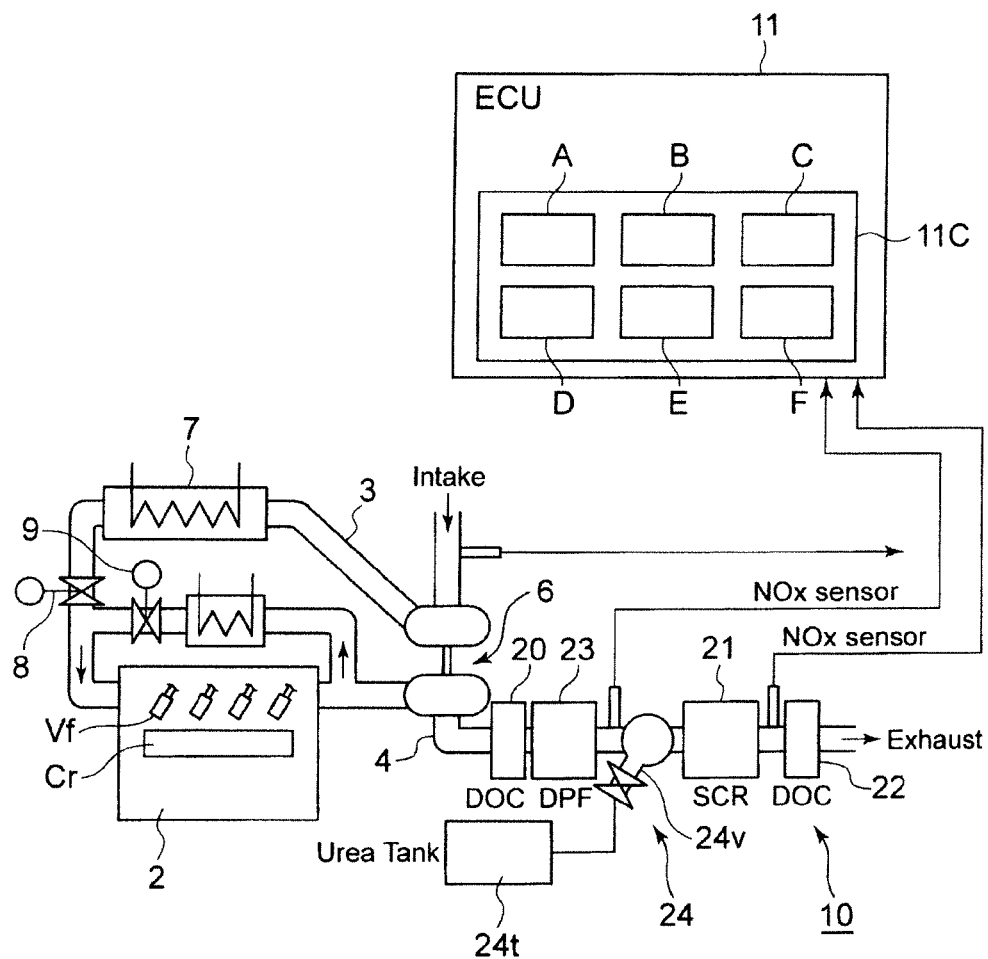
FIG. 2 is a partial configuration diagram schematically illustrating an exhaust gas purification apparatus in the internal combustion engine of FIG. 1.

Next, with reference to FIG. 2, further illustrating the exhaust gas purification apparatus 10 in the above internal combustion engine 1, the essential configuration of the present invention will be described in detail. The configuration around the engine body 2 is as described above, and thus not explained herein. The exhaust gas purification apparatus 10 first includes an oxidation catalyst 20, which is a diesel oxidation catalyst (DOC), disposed on the upstream side of the exhaust duct 4 constituting the exhaust-gas passage connected to the engine body 2. The exhaust gas purification apparatus 10 also includes a SCR catalyst 21 for purifying NOx in the exhaust gas of the engine body 2, disposed at the downstream side of the oxidation catalyst 20, and another oxidation catalyst 22 for removing excess ammonia discharged from the SCR catalyst 21, disposed at the downstream side of the SCR catalyst 21. Further, a diesel particulate filter (DPF) 23 may be disposed between the oxidation catalyst 20 and the SCR catalyst 21 at the downstream side of the oxidation catalyst 20. The DPF 23 is a filter for removing particulate matters (PM) that collects in the exhaust gas. In FIG. 1, the DPF 23 and the DOC 20 are integrally accommodated. A urea injection unit 24 for injecting urea-aqueous solution is disposed at the downstream side of the DPF 23, which is also the upstream side of the SCR catalyst 21. Although not illustrated in detail, the urea injection unit 24 includes an electromagnetic injection valve 24v and a tank 24t for storing urea-aqueous solution. The electromagnetic injection valve 24v has an injection nozzle disposed inside the exhaust duct 4. When the urea injection unit 24 injects urea-aqueous solution into the exhaust duct 4 through the electromagnetic injection valve 24v, a chemical reaction begins with evaporation caused by exhaust heat and leads to hydrolysis that produces ammonia $NH_3$, which serves as a direct reducing agent. $NH_3$ and NOx in the exhaust gas react while passing through the SCR catalyst 21 to change into nitrogen $N_2$ and water $H_2O$. With this reaction, purification of NOx is executed. Further, in this case, detection signals from the NOx sensors $S_{n1}$, $S_{n2}$ disposed on the upstream and downstream sides, respectively, of the SCR catalyst 21 are transmitted to the ECU 11 through CAN (as illustrated), so that the amount of injection of the urea-aqueous solution is controlled in accordance with the important engine parameters such as the operational temperature and the engine speed. In the above internal combustion engine 1, the ECU 11 executes the predetermined signal processing and calculation processing, and the NOx purifying processing of the exhaust gas purification apparatus 10 in response to sensor outputs from the various sensors disposed on the engine body 2, the intake duct 3, the exhaust duct 4, the EGR duct 5, and the exhaust gas purification apparatus 10, and to the acceleration input signals.

The ECU 11 includes an exhaust gas purification controller part 11C for executing the NOx purification process. The exhaust gas purification controller part 11C includes a $NH_3$ adsorption calculation part A, a NOx estimate derivation part B, a SCR catalyst heating command part C, a SCR catalyst initialization determination part D, a SCR catalyst heating capability determination part E, and a SCR catalyst heating completion determination part F. The $NH_3$ adsorption calculation part A calculates an estimate of the amount of $NH_3$ adsorption that is adsorbed on the SCR catalyst, on the basis of the amount of $NH_3$ injection produced from urea-aqueous solution injected into the exhaust-gas passage 4 from the upstream side of the SCR catalyst, and the amount of $NH_3$ injection for purifying NOx at the upstream side of the SCR catalyst. The NOx estimate derivation part B derives an estimate of the amount of NOx at the downstream side of the SCR catalyst on the basis of the estimate of the amount of $NH_3$ adsorption from the $NH_3$ adsorption calculation part, and the temperature of the SCR catalyst. The SCR catalyst heating command part C initializes the SCR catalyst by heating the SCR catalyst to initialize the estimate of the $NH_3$ adsorption, on the basis of an error between the estimate of the amount of NOx from the NOx estimate derivation part and a measurement of the amount of NOx at the downstream side of the SCR catalyst. The SCR catalyst initialization determination part D determines initialization of the SCR catalyst, on the basis of the error between the estimate of the amount of NOx and the measurement of the amount of NOx at the downstream side of the SCR catalyst, on the basis of whether a predetermined time has elapsed after completing heating of the SCR catalyst, or on the basis of the measurement of the amount of NOx at the downstream side of the SCR catalyst. The SCR catalyst heating capability determination part E determines that it is possible to heat the SCR catalyst when forced regeneration of the filter for removing the particulate matters in the exhaust gas is unnecessary and when the SCR catalyst is within an operational range in which heating is possible. Further, the exhaust gas purification controller part includes the SCR catalyst heating completion determination part F.

The first embodiment of the exhaust gas purification apparatus for implementing the exhaust gas purification method for an internal combustion engine according to the present invention is as described above. Next, a NOx purification process of the exhaust gas purification apparatus 10 will be described along with a series of operations of the above internal combustion engine 1. The series of operations of the internal combustion engine 1 will be schematically described because it is not an essential part of the present invention. When the key switch Sw is turned on, electric current is applied to the ECU 11 from the in-vehicle battery 13, so that the starter motor Mst is driven to rotate the crank shaft of the engine body 2. As a result, fuel is injected into the cylinder through the injector in response to a command from the ECU 11, thereby starting the engine. At this point, the combustion air drawn in through the intake duct 3 is changed into air having a high pressure and a high temperature by a compressor of the turbocharger 6, and then cooled by the intercooler 7 to be supplied into the cylinder inside the engine body 2, while high-pressure fuel is injected into the cylinder through the common rail Cr and the fuel injection valve Vf. As a result, combustion is started. The combustion gas is discharged into the exhaust gas purification apparatus 10 through the exhaust duct 4 while rotating the turbine of the turbocharger 6. Further, a part of the exhaust gas is re-circulated into the cylinder of the engine body 2 through the EGR duct 5 to be combusted again.

Exhaust gas that has been supplied to the exhaust gas purification apparatus 10 through the exhaust duct 4 passes through the DOC 20 being an oxidation catalyst and DPF 23 in sequence, where the non-combusted portion of the PM in the exhaust gas is combusted and the PM is removed, and then passes through the SCR catalyst 21. As a result, NOx in the exhaust gas is purified. Further, excess ammonia discharged from the SCR catalyst 21 is removed by the oxidation catalyst 22 at the downstream side of the SCR catalyst 21, before the exhaust gas is finally discharged. When the exhaust gas passes through the SCR catalyst 21, urea-aqueous solution is injected into the exhaust duct 4 through the electromagnetic injection valve 24v at the urea injection unit 24, so that ammonia $NH_3$ serving as a direct reducing agent is produced by a chemical reaction that begins with evaporation caused by exhaust heat and leads to hydrolysis. $NH_3$ and NOx in the exhaust gas reacts while passing through the SCR catalyst 21 and then changes into nitrogen $N_2$ and water $H_2O$. This reaction makes it possible to purify NOx.

When exhaust gas passes through the DOC 20 and the DPF 23 of the exhaust gas purification apparatus 10, the temperature of the exhaust gas is detected by the DOC inlet temperature sensor $S_{dpint}$, the DPF inlet temperature sensor $S_{dpint}$, the DPF differential pressure sensor $S_{dp}$, and the DPF outlet pressure sensor $S_{dpout}$, and then transmitted to the ECU 11 in sequence. Next, when the exhaust gas passes through the SCR catalyst 21, detection signals from NOx sensor $S_{n1}$, the exhaust temperature sensor, and the NOx sensor $S_{n2}$ are transmitted to the ECU 11.

Figure 3:
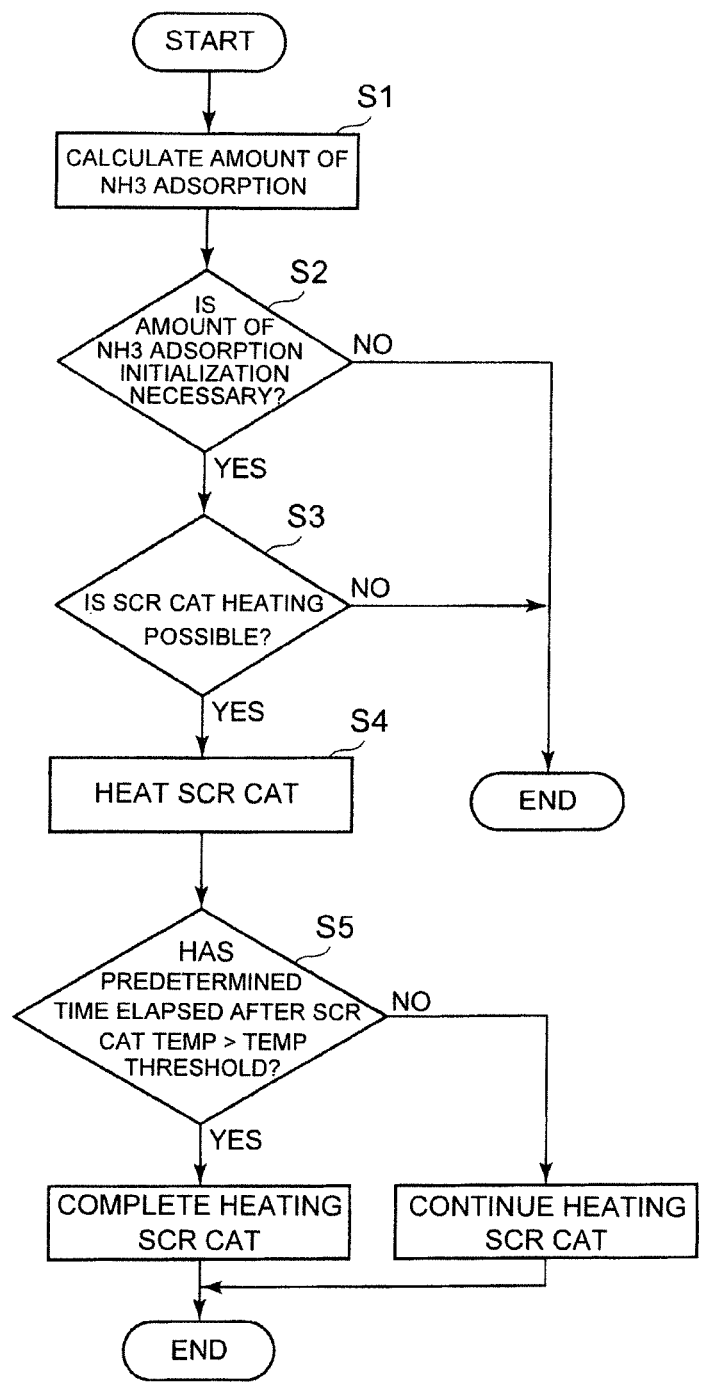
FIG. 3 is a flowchart of an SCR catalyst initializing process according to the first embodiment.
Figure 4:
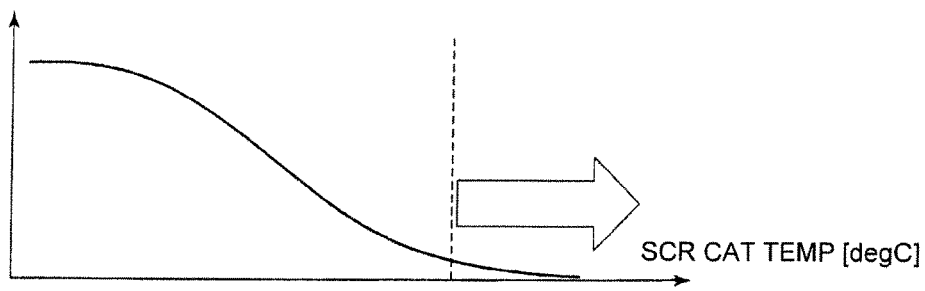
FIG. 4 is a graph of the amount of $NH_3$ that can be adsorbed, related to a temperature of the SCR catalyst.

The exhaust gas purification controller part 11C of the ECU 11 executes the processing illustrated in FIG. 3 on the basis of the received detection signals. Specifically, it executes (1) SCR catalyst initialization determination, (2) SCR catalyst heating capability determination, (3) SCR catalyst heating, and (4) SCR catalyst heating completion determination. First, the $NH_3$ adsorption calculation part A calculates the amount of $NH_3$ adsorption (S1). As described above, the amount of $NH_3$ that can be adsorbed on the SCR catalyst varies depending on the temperature of the SCR catalyst. For instance, FIG. 4 illustrates a relationship between the temperature of the SCR catalyst and the amount of $NH_3$ that can be adsorbed. Specifically, the amount of $NH_3$ that can be adsorbed reaches its peak at a predetermined temperature (approximately 200° C.) and then declines after exceeding this predetermined temperature. As the temperature rises higher, the amount of adsorption approaches zero, where $NH_3$ is hardly adsorbed. The amount of $NH_3$ adsorption can be obtained by the following equation.

Estimate value of the amount of $NH_3$ adsorption $(g)=f$(the amount of urea injection−the amount of $NH_3$ injection for purification)

Figure 5:
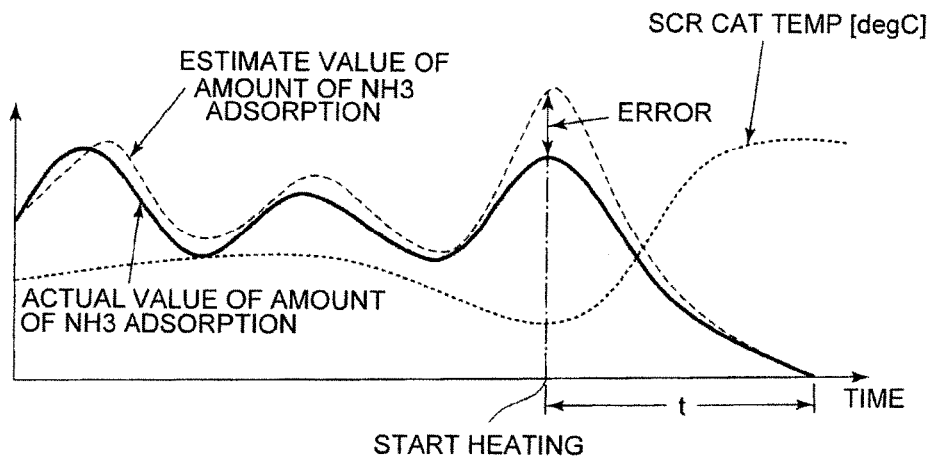
FIG. 5 is a graph of a time-series change comparing an estimate and measurement of the amount of $NH_3$ adsorption, and of a corresponding change in the temperature of the SCR catalyst.

The amount of urea injection here is the amount of $NH_3$ injected from the urea injection unit 24 at the upstream side of the SCR catalyst 21, while the amount of $NH_3$ injection for purification here is the amount of $NH_3$ required for purification. These amounts are obtained by predetermined calculations. At the same time, the NOx estimate derivation part B derives an estimate of the amount of NOx at the downstream side of the SCR catalyst, on the basis of the estimate of the $NH_3$ adsorption from the $NH_3$ adsorption calculation part A, and the temperature of the SCR catalyst. The above estimate of the amount of NOx corresponds to the estimate of the $NH_3$ adsorption, and thus can be represented by a curve of the estimate of the $NH_3$ adsorption as indicated by the dotted line in FIG. 5. On the other hand, the measurement of the amount of NOx at the downstream side of the SCR catalyst is assumed as being the actual amount of $NH_3$ adsorption, as indicated by the solid line. FIG. 5 also illustrates the temperature of the SCR catalyst. FIG. 5, as described above, illustrates that the difference increases between the estimate of the amount of $NH_3$ adsorption, which is the estimate of the NOx amount at the downstream side of the SCR catalyst, and the actual amount of $NH_3$ adsorption, which is the measurement of the amount of NOx at the downstream side of the SCR catalyst.

Next, at S2, the exhaust gas purification controller part 11C of the ECU 11 executes determining commencement of SCR catalyst initialization. Note that the SCR catalyst initialization is commenced when one of the conditions (1) to (3) below is met. Specifically, the SCR catalyst initialization determination part D determines the following conditions.
(1) When an error of NOx at the outlet of the SCR catalyst is large. This means that, as illustrated in FIG. 5, as a result of purification of the exhaust gas having proceeded, the difference between the estimate of the $NH_3$ adsorption, which is the estimate of the amount of NOx at the downstream side of the SCR catalyst, and the actual amount of $NH_3$ adsorption, which is the measurement of the amount of NOx at the downstream side of the SCR catalyst, has been accumulated, and then the error of NOx at the outlet of the SCR catalyst has exceeded a predetermined threshold. Specifically, the lower limit of the error>the cumulative value of the NOx error, or the upper limit of the error<the cumulative value of the NOx error, where the NOx error=the amount of NOx at the downstream side of the SCR catalyst, which is the amount of $NH_3$ injection for purification (e.g., measurement of a sensor)−the estimate of the amount of NOx at the downstream side of the SCR catalyst, which is the estimate of the amount of $NH_3$ adsorption.
(2) When a predetermined time (for instance, 30 to 50 hours) has elapsed after determining completion of heating of the SCR catalyst. Note that, when DPF forced regeneration is executed, it is determined that the SCR catalyst has been heated.
(3) When it is determined that $NH_3$ slip has occurred, on the basis of the value of the NOx sensor $S_{n2}$ at the downstream side of the SCR catalyst.

Further, at S3, the exhaust gas purification controller part 11C of the ECU 11 determines whether it is possible to heat the SCR catalyst. Note that the SCR catalyst initialization is determined to be possible when one of the conditions (1) and (2) below is met. Specifically, the SCR catalyst heating capability determination part E determines the following conditions.
(1) When the SCR catalyst is within an operational range in which heating is possible according to a heating capability determination map. In this case, a map needs to be prepared in advance.
(2) In a state where it is unnecessary to execute DPF forced regeneration.

DPF forced regeneration is, for instance, an operation for carrying out combustion regeneration by e.g. Late Post injection when there is blockage caused by PM. If it is necessary to perform such DPF forced regeneration, the DPF forced regeneration is carried out as a priority. This is because executing the DPF forced regeneration involves heating the SCR catalyst.

Next, at S4, the exhaust gas purification controller part 11C of the ECU 11 outputs a command for heating the SCR catalyst. Specifically, the following is executed by the SCR catalyst heating command part C.
(1) The DPF inlet temperature is controlled upon heating the SCR catalyst by the same control technique used in the DPF forced regeneration. In this way, it is possible to simplify control. The opening degree of the throttle valve 8 is restricted and the SCR catalyst is heated by Early Post injection until the DOC 20 reaches the activation temperature (approximately 250° C.) or higher. Post injection means injection of fuel that has remained after the main injection into the cylinder. Further, when the temperature of the DOC 20 is the activation temperature (approximately 250° C.) or higher, the temperature of the DPF inlet is controlled by Late Post injection, because it is difficult to control the temperature at the upstream side of the SCR catalyst. A DPF temperature at which the temperature of the SCR catalyst reaches 450° C. or higher is obtained is advance to be used as a target temperature.
(2) In a system without the DPF 23, the temperature of the upstream side of the SCR catalyst is increased by restricting the opening degree of the throttle valve 8 and carrying out Early Post injection.

Next, at S5, the exhaust gas purification controller part 11C of the ECU 11 executes determination of completion of the heating of the SCR catalyst. The SCR catalyst heating completion determination part F completes the heating process when a predetermined time has elapsed after the temperature of the SCR catalyst has become greater than the threshold temperature (400 to 450° C.). In this case, a time "t" when the $NH_3$ adsorbed on the SCR catalyst becomes substantially zero after the start of the heating is determined in advance. As illustrated in FIG. 5, when the temperature of the SCR catalyst is increased, the estimate of the amount of $NH_3$ adsorption and the actual amount of $NH_3$ adsorption become zero. As a result, initialization of the estimate of the amount of $NH_3$ adsorption, which is initialization of the SCR catalyst, is achieved.

As described above, according to the present embodiment, it is possible to initialize the SCR catalyst by heating the SCR catalyst. Thus, it is no longer necessary to execute the initializing procedures and complicated calculations, unlike the conventional techniques.

Figure 6:
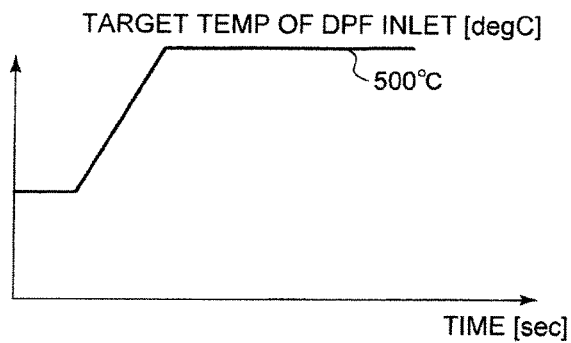
FIG. 6 is a graph of an example of an increase at a predetermined rate of the temperature of the SCR catalyst to a target temperature from a DPF inlet temperature at execution of the control of the DPF inlet temperature, upon increasing the temperature of the SCR catalyst in a second embodiment.
Figure 7:
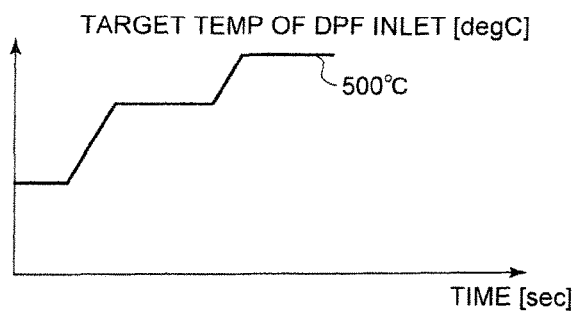
FIG. 7 is a graph of an example of a two-stage increase of the temperature to the target temperature from the DPF inlet temperature.
Figure 8:
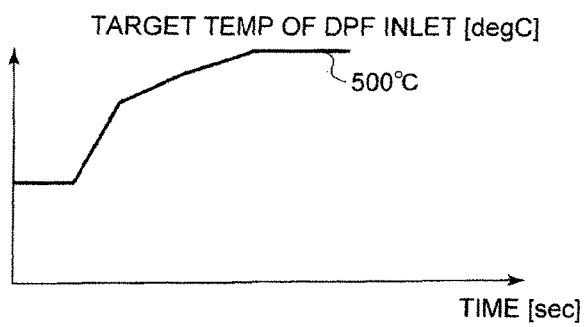
FIG. 8 is a graph of an example of a multi-stage increase of the temperature to the target temperature from the DPF inlet temperature.

The present invention can be implemented as in a second embodiment below. In the present embodiment, when heating the SCR catalyst at S4 of the first embodiment, the temperature of the DPF inlet is controlled with parameters varied from those used in the DPF forced regeneration. Herein, the DPF inlet target temperature achieved by the DPF inlet temperature control is approximately 500° C. (It is approximately 600° C. in the DPF forced regeneration). In this case, when increasing the temperature of the DPF inlet by the DPF inlet temperature control, the DPF inlet is heated to a target temperature taking an amount time suitable for a constant rate (deg./sec), after start of the heating. This is because the amount of $NH_3$ adsorption rapidly decreases to cause $NH_3$ slip if the temperature is increased instantly to the target temperature after the start of the heating. In this case, as a way of heating, the heating rate may be set so as to increase the temperature in any number of stages (see FIGS. 6, 7, and 8). FIG. 6 illustrates a case where the DPF inlet is heated so as to reach the target temperature (500° C.) from the initial temperature in a single stage. FIG. 7 illustrates a case where the DPF inlet is heated so as to reach the target temperature (500° C.) from the initial temperature in two stages. FIG. 8 illustrates a case where the DPF inlet is heated so as to reach the target temperature (500° C.) from the initial temperature in multi-stages.

As described above, lowering the target temperature of the DPF inlet makes it possible to reduce the risk of oil dilution in which a part of fuel adheres to the cylinder wall and causes dilution of the engine oil. Upon controlling the temperature of the DPF inlet, the target temperature of the DPF inlet is increased at a constant rate after start of the heating so as to secure the amount of $NH_3$ adsorption during the heating, which makes it possible to restrict occurrence of $NH_3$ slip due to a rapid decrease in the amount of $NH_3$ adsorption. On the other hand, it is desirable to reach the target temperature from the initial temperature in a shortest possible time to avoid the risk of oil dilution. In view of this, it is possible to reduce the risk of oil dilution by heating slowly at a constant rate until the temperature of the DPF inlet reaches the target temperature. It is also possible to restrict $NH_3$ slip.

Figure 9:
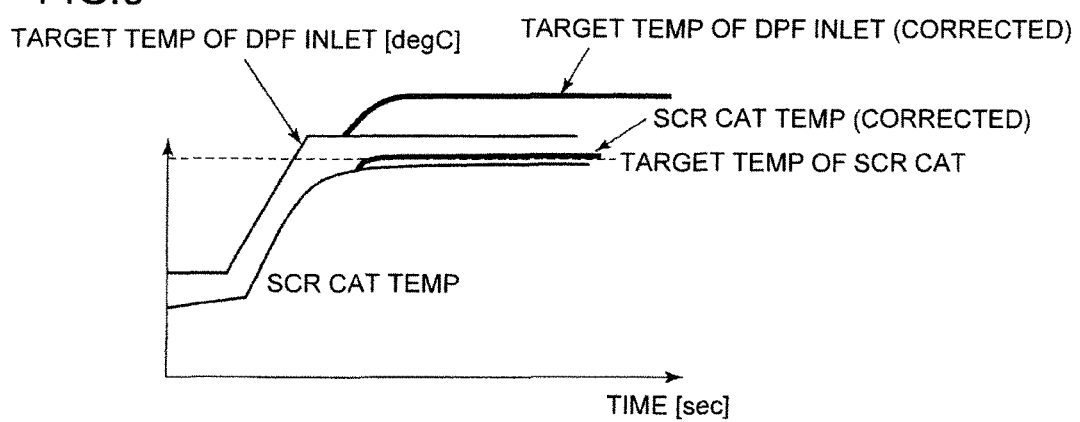
FIG. 9 is a schematic graph of correction of a DPF inlet target temperature according to a third embodiment.

Further, the present invention may be implemented as in a third embodiment below. The present embodiment is to address a case where the SCR catalyst cannot be heated to a required temperature due to changes in the surrounding environments such as increasing heat radiation of the exhaust duct at a low outside temperature, for instance, using control of the temperature of the DPF inlet carried out in the second embodiment. For the above purpose, the temperature of the DPF inlet is corrected by the temperature of the SCR catalyst or the temperature at the upstream side of the SCR catalyst, which makes it possible to heat the SCR catalyst to a required temperature (see FIG. 9). FIG. 9 illustrates a change over time of the target temperature of the DPF inlet and a corresponding change over time of the temperature of the SCR catalyst.

Figure 10:
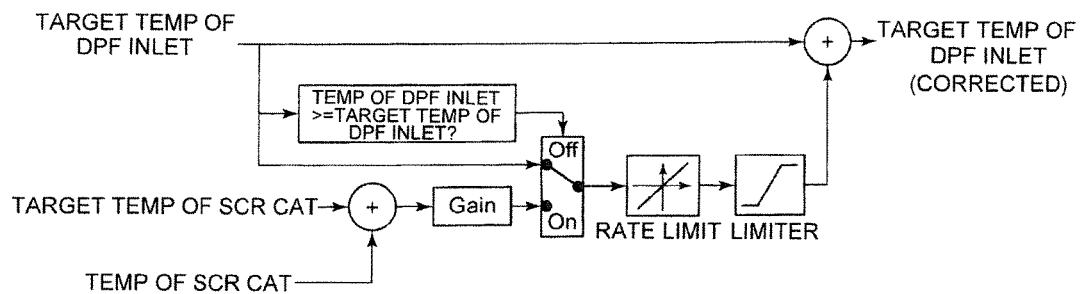
FIG. 10 is a block diagram of a flow of a specific correction of the DPF inlet target temperature as illustrated in FIG. 9.

Now, the third embodiment will be described below by reference to FIG. 10 illustrating the flow of the correction procedure of the target temperature of the DPF inlet. FIG. 10 illustrates a correction procedure for achieving the target value of the DPF inlet after a correction indicated by the thick solid line in FIG. 9. That is, FIG. 10 illustrates the procedure for correcting the target temperature of the DPF inlet using the temperature of the SCR catalyst or the target temperature of the SCR catalyst. The above correction procedure is executed when the temperature of the DPF inlet is lower than the target temperature of the DPF inlet upon comparison of the same.

As a correction procedure, the corrected target temperature of the DPF inlet is achieved at a predetermined rate limit (heating rate) from the temperature of the DPF inlet and by taking account of a predetermined limiter.

As another correction procedure, there may be a route in which a deviation between the target temperature of the SCR catalyst (for instance, 450° C.) and the temperature of the SCR catalyst (the temperature at the upstream side of the SCR catalyst, for instance, 400° C.) is taken into account to obtain such a gain that eliminates the above deviation, the route thereby reaching the corrected target temperature of the DPF inlet, at a predetermined rate limit and taking account of a predetermined limiter.

As described above, the correction procedure is carried out using the target temperature of the SCR catalyst and the temperature of the SCR catalyst, which is the temperature at the upstream side of the SCR catalyst. As a result, it is possible to correct the target temperature of the DPF inlet and to heat the SCR catalyst securely even in a cold place using the corrected target temperature of the DPF inlet.

Besides, in the third embodiment, the target of the temperature control upon heating the SCR catalyst is (1) the temperature of the DPF outlet, (2) the temperature at the upstream side of the SCR, or (3) the temperature of the SCR catalyst, in order to heat the SCR catalyst to a required temperature. This means temperature control due to the temperature sensors between the engine body 2 and the exhaust duct 4 being disposed on (1) the DPF outlet, (2) the upstream side of the SCR, and (3) the SCR catalyst. It becomes more difficult to control the temperature to heat the SCR catalyst to a required temperature as the positions of the sensors become farther from the engine body 2. However, when the SCR catalyst is controlled, it is possible to heat the SCR catalyst to a required temperature or higher.

As described above, the present invention makes it possible to achieve initialization of the SCR catalyst by increasing the temperature of the SCR catalyst. Thus, it is no longer necessary to execute the troublesome initialization procedures and complicated calculations, unlike the conventional techniques.

In the present invention, it is possible to achieve initialization of the SCR catalyst without requiring complicated and troublesome initialization procedures, which makes it possible to reduce the manufacture cost in terms of the apparatus. Thus, the present invention is highly applicable to various engines.

The invention claimed is:

1. An exhaust gas purification method for an internal combustion engine for purifying NOx in exhaust gas in the internal combustion engine using a SCR catalyst arranged in an exhaust-gas passage of the internal combustion engine, the exhaust gas purification method comprising:
   injecting a quantity of $NH_3$ produced from a urea-aqueous solution injected into the exhaust-gas passage from an upstream side of the SCR catalyst;
   calculating an integral value of subtracting an amount of $NH_3$ for purifying NOx in the exhaust-gas passage at the upstream side of the SCR catalyst from the injected quantity of $NH_3$ over a predetermined time;
   calculating an estimate of an amount of $NH_3$ adsorption on the SCR catalyst, based, at least in part, on the integral value;
   measuring or estimating a temperature of the SCR catalyst;
   measuring or estimating an amount of NOx in the exhaust-gas passage at the upstream side of the SCR catalyst;
   deriving an estimated value of an amount of NOx in the exhaust-gas passage at a downstream side of the SCR catalyst, based, at least in part, on the estimated amount of $NH_3$ adsorption, the temperature of the SCR catalyst, and the amount of NOx in the exhaust-gas passage at the upstream side of the SCR catalyst;
   determining an error between the estimate of the amount of NOx and a measurement value of the amount of NOx in the exhaust-gas passage at the downstream side of the SCR catalyst;
   determining commencement of initialization of the SCR catalyst based, at least in part, on the determined error; and
   heating the SCR catalyst to initialize the amount of $NH_3$ adsorption on the SCR catalyst based, at least in part, on determining that initialization of the SCR catalyst has commenced.

2. The exhaust gas purification method for an internal combustion engine according to claim 1, further comprising:
   determining if the SCR catalyst is within an operational range in which the heating is possible; and
   heating the SCR catalyst based, at least in part, on the SCR catalyst being within the operational range and based, at least in part, on determining that forced regeneration of a filter for removing particulate matters in the exhaust gas is unnecessary.

3. The exhaust gas purification method for an internal combustion engine according to claim 1, wherein the determined error is smaller than a lower limit or greater than an upper limit.

4. The exhaust gas purification method for an internal combustion engine according to claim 1, further comprising:
   determining commencement of initialization of the SCR catalyst after a predetermined time has elapsed after determination of completion of the heating of the SCR catalyst.

5. The exhaust gas purification method for an internal combustion engine according to claim 1, further comprising:
   performing forced regeneration of a filter for removing particulate matters in the exhaust gas, and
   controlling an inlet temperature of the filter for removing particulate matters at the upstream side of the SCR catalyst.

6. The exhaust gas purification method for an internal combustion engine according to claim 5, further comprising:
   controlling the inlet temperature of the filter for removing particulate matters to achieve a first target inlet temperature that is different from a second target inlet temperature used for forced regeneration of the filter for removing particulate matters.

7. The exhaust gas purification method for an internal combustion engine according to claim 6, further comprising:
   increasing the inlet temperature of the filter for removing particulate matters to the first target inlet temperature at a predetermined increase rate from a starting temperature.

8. The exhaust gas purification method for an internal combustion engine according to claim 7, further comprising:
   increasing the inlet temperature of the filter for removing particulate matter to the first target inlet temperature in a plurality of stages from a starting temperature.

9. The exhaust gas purification method for an internal combustion engine according to claim 6, further comprising:
   correcting the first target inlet temperature by the temperature of the SCR catalyst or by a temperature at the upstream side of the SCR catalyst.

10. The exhaust gas purification method for an internal combustion engine according to claim 6, further comprising:
    controlling the inlet temperature of the filter for removing particulate matters based, at least in part, on an outlet temperature of the filter for removing particulate matters.

11. The exhaust gas purification method for an internal combustion engine according to claim 6, further comprising:
    controlling the inlet temperature of the filter for removing particulate matters based, at least in part, on the temperature at the upstream side of the SCR catalyst or on the temperature of the SCR catalyst.

* * * * *